US010294983B2

(12) United States Patent
Parker et al.

(10) Patent No.: US 10,294,983 B2
(45) Date of Patent: May 21, 2019

(54) SOCKET ASSEMBLY AND METHOD OF MAKING A SOCKET ASSEMBLY

(71) Applicant: Federal-Mogul Motorparts Corporation, Southfield, MI (US)

(72) Inventors: Glen C. Parker, St. Peters, MO (US); Kurt R. Bretz, Albers, IL (US); Brennan Sugg, St. Louis, MO (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 173 days.

(21) Appl. No.: 15/178,779

(22) Filed: Jun. 10, 2016

(65) Prior Publication Data

US 2017/0356489 A1 Dec. 14, 2017

(51) Int. Cl.
*F16C 11/06* (2006.01)
*F16C 11/08* (2006.01)

(52) U.S. Cl.
CPC .......... *F16C 11/08* (2013.01); *F16C 11/0619* (2013.01); *F16C 11/0623* (2013.01); *F16C 11/0642* (2013.01); *F16C 11/0685* (2013.01); *F16C 11/068* (2013.01);
(Continued)

(58) Field of Classification Search
CPC ..... Y10T 403/32631; Y10T 403/32672; Y10T 403/32713; Y10T 403/32721; Y10T 403/32729; Y10T 403/32737; Y10T 403/32754; Y10T 403/32762; Y10T 403/32811; F16C 11/0619; F16C 11/0623; F16C 11/0633; F16C 11/0638; F16C 11/0642; F16C 11/0652; F16C 11/0685
See application file for complete search history.

(56) References Cited

U.S. PATENT DOCUMENTS 2,618,049 A * 11/1952 Flumerfelt .......... F16C 11/0604 29/441.1
2,880,025 A * 3/1959 Herbenar ............ F16C 11/0604 403/133
(Continued)

FOREIGN PATENT DOCUMENTS

DE 1294105 B 4/1969
DE 102008003463 A1 7/2009

OTHER PUBLICATIONS

International Search Report, dated Aug. 28, 2017 (PCT/US2017/036676).

*Primary Examiner* — Jonathan P Masinick
(74) *Attorney, Agent, or Firm* — Robert L. Stearns; Dickinson Wright, PLLC

(57) ABSTRACT

The socket assembly includes a housing with an inner bore that extends from a wall at a closed end to an open end. A ball stud is received in the inner bore, and a shank portion of the ball stud projects out through the open end. A backing bearing is movably disposed in the inner bore. The backing bearing presents a bearing surface which is in sliding contact with a ball portion of the ball stud. An exit bearing is locked into a fixed position within the inner bore and has another bearing surface which is in sliding contact with the ball portion. A spring is positioned between the wall and the backing bearing and imparts a preload force against the backing bearing. The wall is deformed to preload the spring against the backing bearing and reduce clearances between components in the socket assembly.

15 Claims, 10 Drawing Sheets

(52) U.S. Cl.
CPC ...... *F16C 2226/12* (2013.01); *F16C 2326/05* (2013.01); *F16C 2326/24* (2013.01)

(56) References Cited

U.S. PATENT DOCUMENTS

| | | | | | |
|---|---|---|---|---|---|
| 3,119,634 | A * | 1/1964 | Gottschald | B60G 7/005 | 403/138 |
| 3,248,955 | A * | 5/1966 | Templeton | B60G 7/005 | 277/635 |
| 3,376,058 | A * | 4/1968 | Herbenar | F16C 11/0604 | 403/126 |
| 3,401,965 | A * | 9/1968 | Wehner | F16C 11/0647 | 384/271 |
| 3,571,880 | A | 3/1971 | Andrew | | |
| 4,286,363 | A * | 9/1981 | Morin | B23P 11/00 | 29/446 |
| 4,880,329 | A * | 11/1989 | Sakai | B60G 7/005 | 29/898.05 |
| 5,066,159 | A * | 11/1991 | Urbach | F16C 11/0666 | 277/635 |
| 5,066,160 | A * | 11/1991 | Wood | B62D 7/166 | 403/132 |
| 5,154,530 | A * | 10/1992 | Dresselhouse | B62D 7/16 | 403/138 |
| 5,286,131 | A * | 2/1994 | Wood | F16C 11/0647 | 403/132 |
| 5,568,930 | A * | 10/1996 | Urbach | F16C 11/0671 | 277/635 |
| 5,904,436 | A * | 5/1999 | Maughan | F16C 11/0628 | 29/441.1 |
| 6,010,271 | A * | 1/2000 | Jackson | F16C 11/0628 | 403/131 |
| 6,413,003 | B1 * | 7/2002 | Schmidt | B62D 7/16 | 403/120 |
| 6,422,779 | B1 * | 7/2002 | Spagnuolo | B62D 3/12 | 280/93.511 |
| 6,533,490 | B2 * | 3/2003 | Kincaid | B60G 7/005 | 403/133 |
| 6,536,779 | B1 * | 3/2003 | Maughan | F16C 11/0671 | 277/635 |
| 6,561,715 | B2 * | 5/2003 | Wasylewski | B62D 7/16 | 280/93.511 |
| 6,619,873 | B2 * | 9/2003 | Parker | F16C 11/0642 | 403/122 |
| 7,644,500 | B2 * | 1/2010 | Schmidt | B23P 11/005 | 29/441.1 |
| 8,047,739 | B2 * | 11/2011 | Sellers | F16C 11/069 | 403/122 |
| 8,714,862 | B2 * | 5/2014 | Mevorach | F16C 11/0642 | 403/125 |
| 2006/0171775 | A1 * | 8/2006 | McLaughlin | F16C 11/0614 | 403/122 |
| 2009/0172947 | A1 | 7/2009 | Orend | | |
| 2018/0119731 | A1 * | 5/2018 | Winter | F16C 11/0685 | |

* cited by examiner

SOCKET ASSEMBLY AND METHOD OF MAKING A SOCKET ASSEMBLY

BACKGROUND OF THE INVENTION

1. Field of the Invention

The present invention is related generally to socket assemblies and, more particularly, to socket assemblies of the type for use in vehicle suspension and steering assemblies.

2. Related Art

Socket assemblies of the type that are generally used in automobile suspension and steering systems typically include a ball stud which is movable relative to a housing. Such socket assemblies typically include one or more bearings that are positioned within the housing and are in sliding contact with a ball portion of the ball stud to facilitate the rotation of the ball stud relative to the housing. The bearings are typically either made of metal or of a hard plastic material.

In socket assemblies with either metal or plastic internal components, internal clearances within the socket assemblies can reduce the operating lives of those socket assemblies. For example, eccentricities between centerlines of various spherically curved components in a socket assembly can cause adverse wear and/or movements in the socket assembly during its operating life.

One approach to minimize clearances between components of a socket assembly is to add an extra component which is collapsible and then collapsing that component during assembly. However, the use of such an additional component is only possible in cases where there is enough space to add such a component, and even then, the addition of such an additional component adds manufacturing and material cost to the socket assembly.

SUMMARY OF THE INVENTION AND ADVANTAGES

One aspect of the present invention is related to a socket assembly which includes a housing with an inner bore that extends along an axis from a wall at a generally closed first end to an open second end. The socket assembly further includes a ball stud with a ball portion that is received in the inner bore of the housing and a shank portion which projects out of the inner bore through the open second end of the housing. A backing bearing is disposed in the inner bore and is unconstrained by the housing in a radial direction. The backing bearing presents a semi-spherically curved first bearing surface which is in sliding contact with an outer surface of the ball portion of the ball stud. An exit bearing is locked into a fixed position within the inner bore of the housing and has a second bearing surface which is in sliding contact with the ball portion of the ball stud. A spring is positioned in the inner bore of the housing between the wall and the backing bearing and imparts a preload force against the backing bearing. The wall at the generally closed first end of the housing is deformed to preload the spring against the backing bearing and to reduce internal clearances between components in the inner bore of the housing.

The socket assembly is advantageous because it allows for the use of fewer components and looser tolerances on dimensional features for those components while still achieving minimal internal clearances between components after assembly. Specifically, the unconstrained nature of the backing bearing in the radial direction allows the backing bearing to automatically situate itself in an ideal location within the inner bore during the deformation operation. The reduced internal clearance produced by deforming the wall of the housing allows for additional consistency during the manufacturing of socket assemblies and for a longer operating life than similar designs without this feature. These improved clearances come with no additional space constraints or cost.

According to another aspect of the present invention, the second bearing surface of the exit bearing includes a semi-spherically curved portion and a cylindrical portion which extends past an equator of the ball portion of the ball stud.

According to yet another aspect of the present invention, the inner bore of the housing has a progressively increasing diameter from the generally closed first end to the open second end and the housing presents a shoulder which faces towards the open second end and wherein the exit bearing abuts the shoulder.

According to still another aspect of the present invention, the housing includes a radially inwardly extending lip at the open second end and wherein the exit bearing is trapped between the radially inwardly extending lip and the shoulder.

According to a further aspect of the present invention, the socket assembly further includes a dust boot which extends from an end that is trapped between the radially inwardly extending lip of the housing and the exit bearing to an end that is sealed against the shank portion of the ball stud.

According to yet a further aspect of the present invention, the spring is a Belleville washer.

According to still a further aspect of the present invention, the generally closed first end includes a lubricant opening.

Another aspect of the present invention is a method of making a socket assembly. The method includes the step of preparing a housing with an inner bore which extends from a wall at a generally closed first end to an open second end and wherein the wall has an exterior surface with a projection that projects in a direction away from the second open end. The method continues with the step of inserting a spring into the inner bore of the housing. The method proceeds with the step of inserting a backing bearing with a first bearing surface into the inner bore of the housing such that the backing bearing is allowed to move in a radial direction within the inner bore relative to the housing. The method continues with the step of inserting a ball portion of a ball stud into the inner bore of the housing and wherein the ball stud has a shank portion which extends from the ball portion out of the inner bore through the open second end of the housing. The method proceeds with the step of fixing an exit bearing with a second bearing surface into a fixed position within the inner bore of the housing. The method continues with the step of deforming the wall at the generally closed first end of the housing to preload the spring against the backing bearing, to urge the first bearing surface of the backing bearing against an outer surface of the ball portion of the ball stud, to further urge the ball portion of the ball stud against the second bearing surface of the exit bearing and to reduce clearances between components in the inner bore of the housing.

According to another aspect of the present invention, the step of further deforming the wall is further defined as pressing the projection of the wall until the exterior surface of the wall is generally flat.

According to yet another aspect of the present invention, the projection is generally conical in shape.

According to still another aspect of the present invention, the inner bore of the housing presents a shoulder that faces towards the open section, and the exit bearing abuts the shoulder.

According to a further aspect of the present invention, the method further includes the step of swaging the open section end of the housing to present a radially inwardly extending lip to trap the exit bearing between the radially inwardly extending lip and the shoulder.

According to yet a further aspect of the present invention, the second bearing surface includes a semi-spherically curved portion and a cylindrical portion.

According to still another aspect of the present invention, the generally closed first end of the housing includes a lubricant opening.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
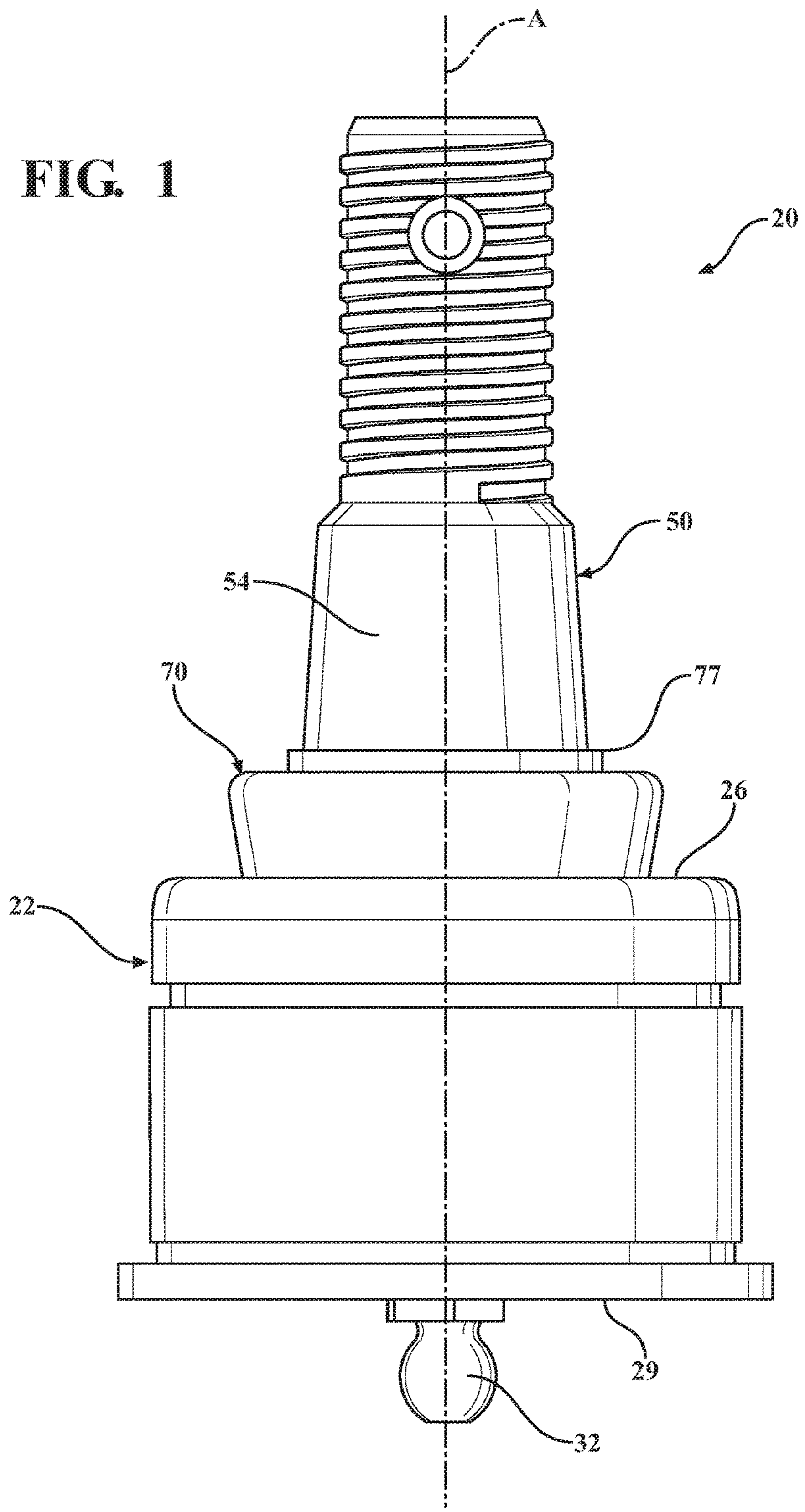
FIG. 1 is a front elevation view of a first exemplary embodiment of a socket assembly constructed according to one aspect of the present invention.

Referring to FIG. 1, wherein like numerals indicate corresponding parts throughout the several views, an exemplary embodiment of an improved socket assembly 20 (specifically, a ball joint assembly), is generally shown. In the exemplary embodiment, the socket assembly 20 is configured for joining a control arm (not shown) with a knuckle (not shown) of a vehicle suspension assembly. However, it should be appreciated that the socket assembly 20 could find uses in tie rod ends or in a wide range of automotive and non-automotive applications.

The socket assembly 20 includes a housing 22 with an inner bore that extends along an axis A from a closed first end 24 to an open second end 26. At the closed first end 24, the housing 22 presents a lower wall 28 with an inner surface 27 and an exterior surface 29. The housing 22 is preferably made of a metal, such as steel or an alloy steel, and may be shaped through any suitable process or combination of processes including, for example, forging, casting, machining from a billet, etc. In the exemplary embodiment, the housing 22 is a cartridge for press-fitting into an opening of the control arm. However, the housing could alternately be integrally formed with another component, e.g., a control arm or a tie rod end. Also, it should be appreciated that the lubricant opening 30 does not have to be on the lower wall 28 but could instead be located on any suitable portion of the housing 22.

The inner bore of the housing 22 has a progressively increasing diameter from the closed first end 24 to the open second end 26. Specifically, the inner bore has a first portion 34 with a first diameter $D_1$ adjacent the closed first end 24, a second portion 36, a third portion 38 with a second diameter $D_2$ that is larger than the first diameter $D_1$ and a fourth portion 39 adjacent the open second end 26 with a third diameter $D_3$ that is greater than the second diameter $D_2$. Between the second and third portions 36, 38, the housing 22 presents a first shoulder 40 which faces towards the open second end 26. Between the third and fourth portions 38, 39, the housing 22 presents a second shoulder 41 which also faces toward the open second end 26. In the exemplary embodiment, the lower wall 28 of the housing presents a lubricant opening 30 which receives a grease fitting 32 to convey a lubricant into the first portion 34 of the inner bore to initially lubricate the socket assembly 20 and to re-lubricate the socket assembly 20 as part of routine maintenance. Alternately, the lubricant opening 30 could open to any of the second, third or fourth portions of the housing 22.

A backing bearing 42 is received in the first portion 34 of the inner bore and has a semi-spherically curved first bearing surface 44 which faces axially towards the second open end 26. The backing bearing 42 has an outer diameter which is less than the first diameter $D_1$ of the first portion 34. As such, the backing bearing 42 is movable within the first portion 34 of the inner bore in a radial direction relative to the housing 22 to allow the backing bearing 42 to float radially within the first portion 34 of the inner bore. The first bearing surface 44 of the exemplary embodiment is provided with a plurality of first grooves 48 formed thereon for conveying a lubricant from the lubricant opening 30 into the second portion 36 of the inner bore. A lower surface of the backing bearing 42 also presents a plurality of second grooves 49 for channeling the lubricant between the backing bearing 42 and the lower wall 28 to reduce friction between the backing bearing 42 and the lower wall 28 and facilitate the radial movement of the backing bearing 42 within the first portion 42 of the inner bore.

The socket assembly 20 further includes a ball stud 50 which is partially received in the inner bore of the housing 22. Specifically, the ball stud 50 includes a ball portion 52 that is fully disposed in the inner bore and a shank portion 54 which projects out of the inner bore through the open second end 26. The exemplary embodiment of the shank portion 54 extends from the ball portion 52 to a distal end which is threaded for receiving a nut to connect the shank portion 52 with another component, e.g., a knuckle. Alternately, the shank portion 54 could be configured for connection with the other component through any suitable means. The ball portion 52 of the ball stud 50 has a generally semi-spherically curved outer surface which has a similar radius of curvature to the first bearing surface 44 of the backing bearing 42. The outer surface of the ball portion 52 is in sliding contact with the first bearing surface 44 of the backing bearing 42 for allowing the ball stud 50 to rotate or pivot relative to the backing bearing 42 and the housing 22 during operation of the suspension assembly. The backing bearing 42 is preferably made of metal, such as steel or a steel alloy and may be shaped through any suitable process.

Figure 4:
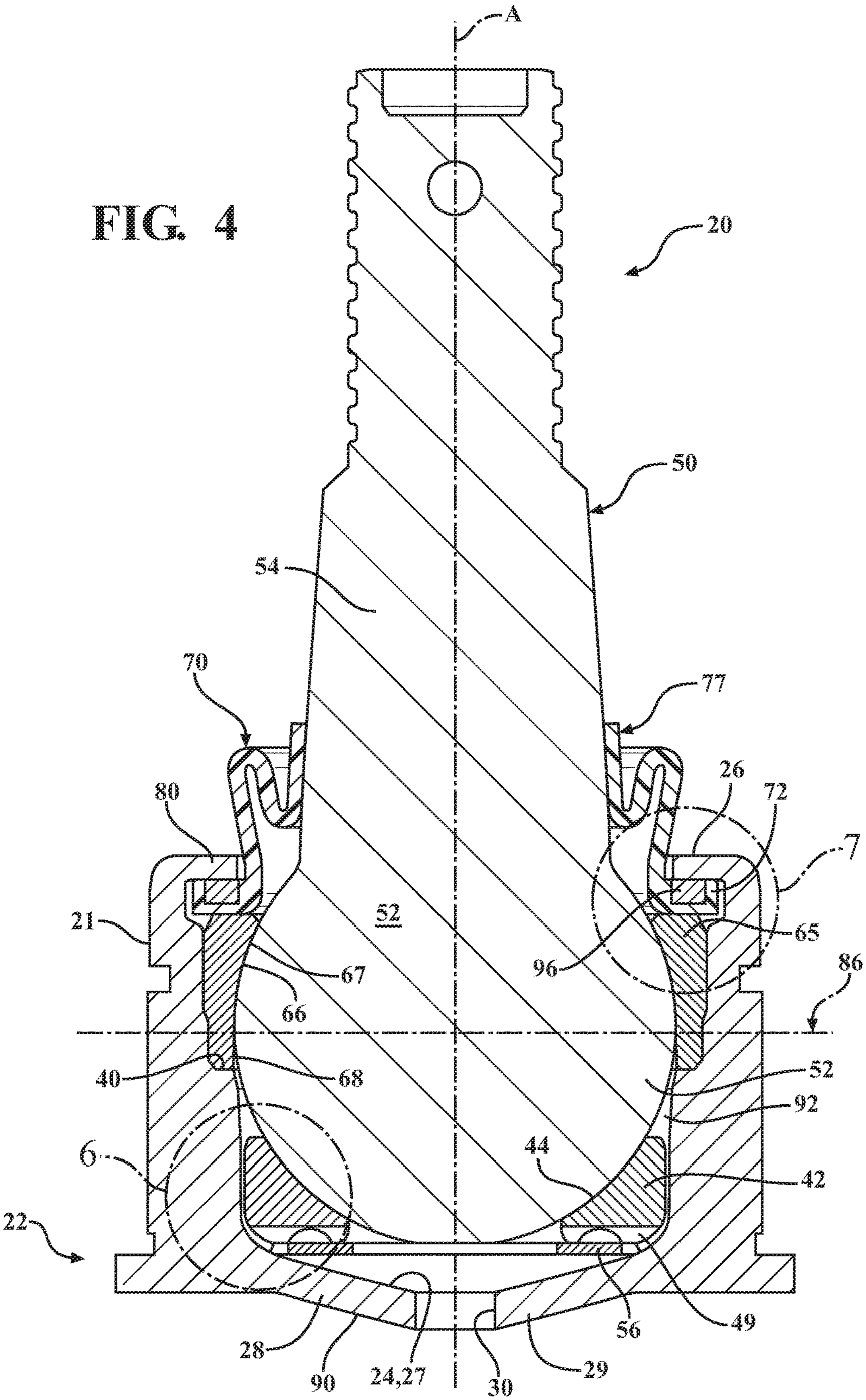
FIG. 4 is a cross-sectional view of the socket assembly of FIG. 1 in a pre-deforming state.

An exit bearing 65 is received in the second portion 36 of the inner bore and has a second bearing surface 66 which is in sliding contact with the ball portion 52 of the ball stud 50. The second bearing surface 66 includes a semi-spherically curved portion 67 and a cylindrical portion 68. The semi-spherically curved portion 67 has a similar radius of curvature as the ball portion 52 and the first bearing surface 44 and is in sliding contact an opposite hemisphere of the ball portion 52 from the first bearing surface 44. The cylindrical portion 68 of the second bearing surface 66 extends past (i.e., below) and is in sliding contact with an equator, or center-line 86, of the ball portion 52 and has a generally constant diameter as viewed in cross-section for a predetermined length. Similar to the first bearing surface 44, the second bearing surface 66 may include one or more grooves for distributing a lubricant around the surface-to-surface contact between the second bearing surface 66 and the ball portion 52 of the ball stud 50 and for conveying the lubricant in the inner bore axially across the exit bearing 65. As shown in FIG. 4, a gap between the backing bearing 42 and the exit bearing 65 functions as a lubrication reservoir which holds the lubricant. The semi-spherically curved portion 67 of the second bearing surface 66 captures the outer surface of the ball portion 52 of the ball stud 50 to limit axial movement of the ball stud 50 in an axial direction towards the open first end 26 of the housing 22. The cylindrical portion 68 of the second bearing surface 66 limits radial movement of the ball stud 50 relative to the housing 22 and transmits radial forces from the ball stud 50 to the housing 22. During operation of the vehicle, the semi-spherically curved portion 67 of the second bearing surface 66 of the exit bearing 65 and the first bearing surface 44 of the backing bearing 42 transfer all or substantially all of the axial forces between the ball stud 50 and the housing 22, and the cylindrical portion 68 of the second bearing surface 66 of the exit bearing 65 transfers all or substantially all of the radial forces between the ball stud 50 and the housing 22.

The exit bearing 65 has a generally flat upper surface 69 which faces towards the open second end 26 of the housing 22. Opposite of the upper surface 69, the exit bearing 65 has a lower surface 71 which is seated against the shoulder 40 of the housing 22 to establish a fixed distance between the lower wall 28 of the housing 22 and the exit bearing 65.

Figure 5:
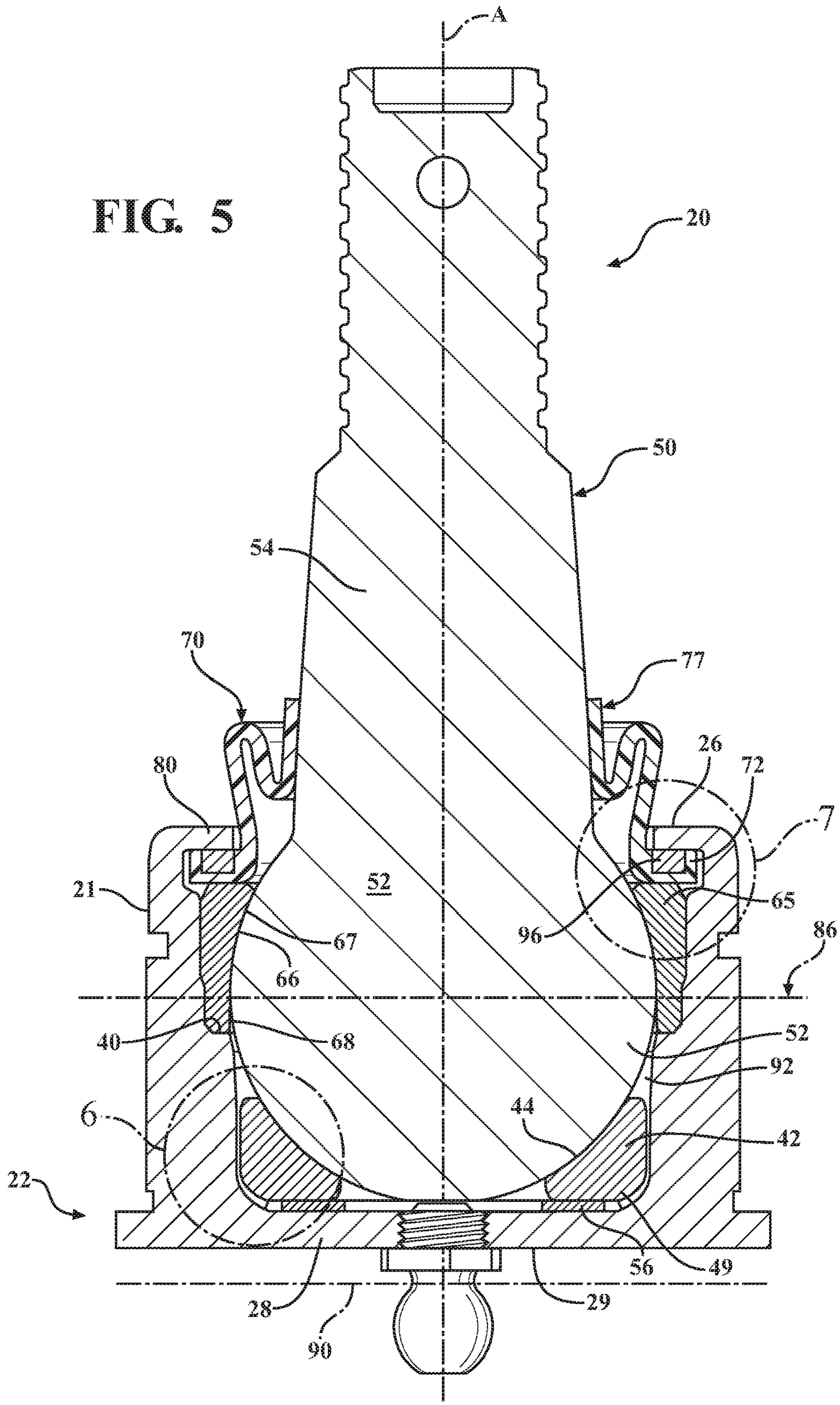
FIG. 5 is a cross-sectional view of the socket assembly of FIG. 1 in after final assembly.
Figure 6:
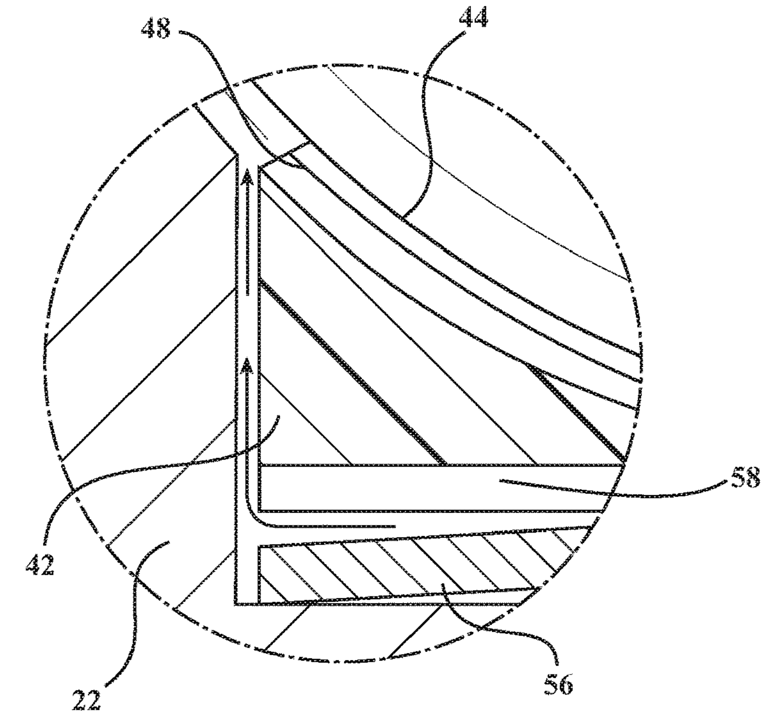
FIG. 6 is an enlarged view of a portion of FIG. 5.
Figure 7:
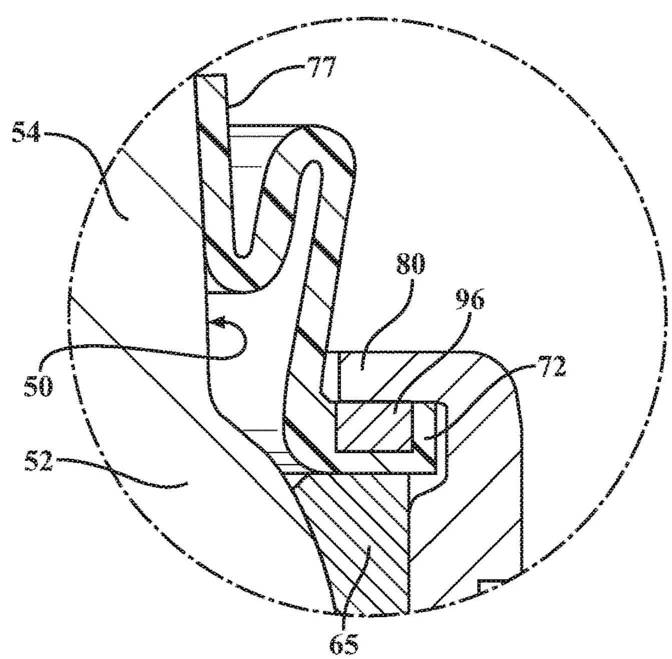
FIG. 7 is an enlarged view of another portion of FIG. 5.

The socket assembly 20 further includes a dust boot 70 which is sealed against the housing 22 and against the ball stud 50 for trapping a lubricant, such as grease, in an interior of the socket assembly 20 and for keeping contaminants outside of the interior of the socket assembly 20. The dust boot 70 includes a boot body 76 which is made of a flexible sealing material, such as rubber or certain plastics. In the embodiment of FIGS. 4, 5 and 7, a radially outwardly extending flange 72 is positioned in the fourth portion 39 of the inner bore of the housing 22. The radially outwardly extending flange 72 is in surface-to-surface contact with the upper surface 69 of the exit bearing 65. The radially outwardly extending flange 72 is also sealed against a radially inwardly extending lip 80 which is formed into the open second end 26 of the housing 22. The dust boot 70 also has an upper end 77 which is sealed against the shank portion 54 of the ball stud 50. The radially inwardly extending lip 80 is preferably formed into the housing 22 by spinning, or swaging, the open second end 26 of the housing 22 inwardly to trap the radially outwardly extending flange 72 of the dust boot 70 and to hold the exit bearing 65 in the position between the radially outwardly extending flange 72 of the dust boot 70 and the shoulder 40 of the housing 22. Also in this embodiment, a rigid and non-flexible insert 96 is at least partially embedded within the radially outwardly extending flange 72 of the boot body 76.

A Belleville spring washer 56 (also known as a washer spring) is positioned in the first portion 34 of the inner bore of the housing 22 and imparts a preload or biasing force by the backing bearing 42 against the ball portion 52 of the ball stud 50 to maintain surface-to-surface contact between the first and second bearing surfaces 44, 66 and the outer surface of the ball portion 52 even as these surfaces wear during operation of the socket assembly 20. It should be appreciated that another type of compression spring, other than a Belleville washer, could alternately be employed.

Figure 2:
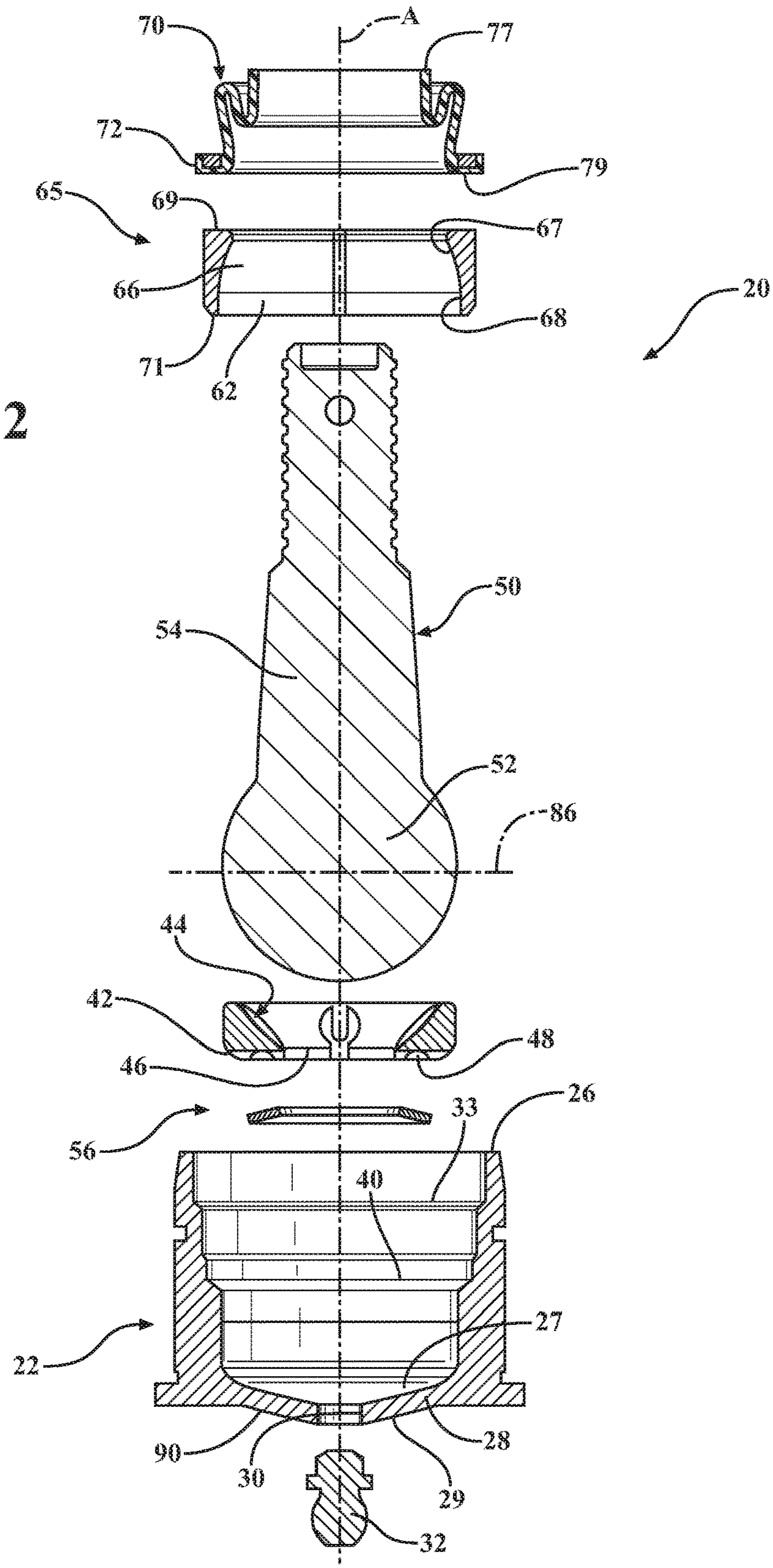
FIG. 2 is an exploded and sectional view of the socket assembly of FIG. 1.
Figure 3:
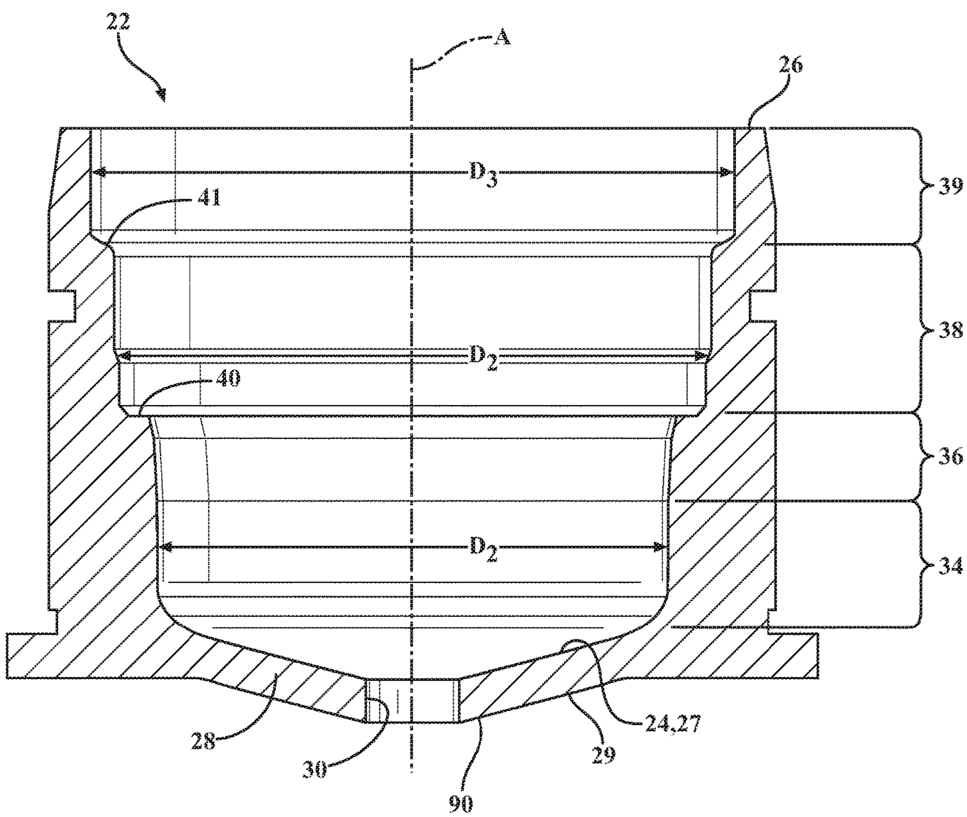
FIG. 3 is a cross-sectional view of a housing of the socket assembly of FIG. 1.

As shown in FIGS. 2-4, the lower wall 28 of the housing 22 is preformed with a conically shaped projection 90 which surrounds the lubricant opening 30 and which projects axially away from the closed first end 24 of the inner bore. In reference to FIG. 5, during manufacture of the socket assembly 20, after the open second end 26 of the housing 22 is swaged, the conically shaped projection 90 is pressed to deform the lower wall 28 such that its exterior surface 29 and its interior surface 27 are generally planar or flat in final form. The flatting of the lower wall 28 further biases the first bearing surface 44 of the backing bearing 42 against the outer surface of the ball portion 52 of the ball stud 50. By way of this pressing operation, all of the clearances between the components in the inner bore of the housing 22 are reduced, and thus, the swaging operation does not affect any clearances between the components of the socket assembly 20.

As shown in FIG. 2, in this exemplary embodiment, the Belleville spring washer 56 is oriented with a concave side facing downward towards the closed first end 24 of the inner bore of the housing 22. The Belleville spring washer 56 is stressed when the exit bearing 65 is pressed into the third portion 38 of the inner bore and is seated against the shoulder 40, which further biases the ball portion 52 of the ball stud 50 against the backing bearing 42, which is further biased against the Belleville spring washer 56 to force the Belleville spring washer 56 into a stressed condition against the lower wall 28 of the housing 22. Alternately, if the Belleville spring washer 56 is placed in the inner bore with the concave side facing towards the open second end 26 of the inner bore, this allows the Belleville spring washer 56 to remain in an unstressed condition until the lower wall 28 is pressed flat (see FIG. 5), thereby preloading the backing bearing 42 against the ball portion 52 of the ball stud 50.

Figure 12:
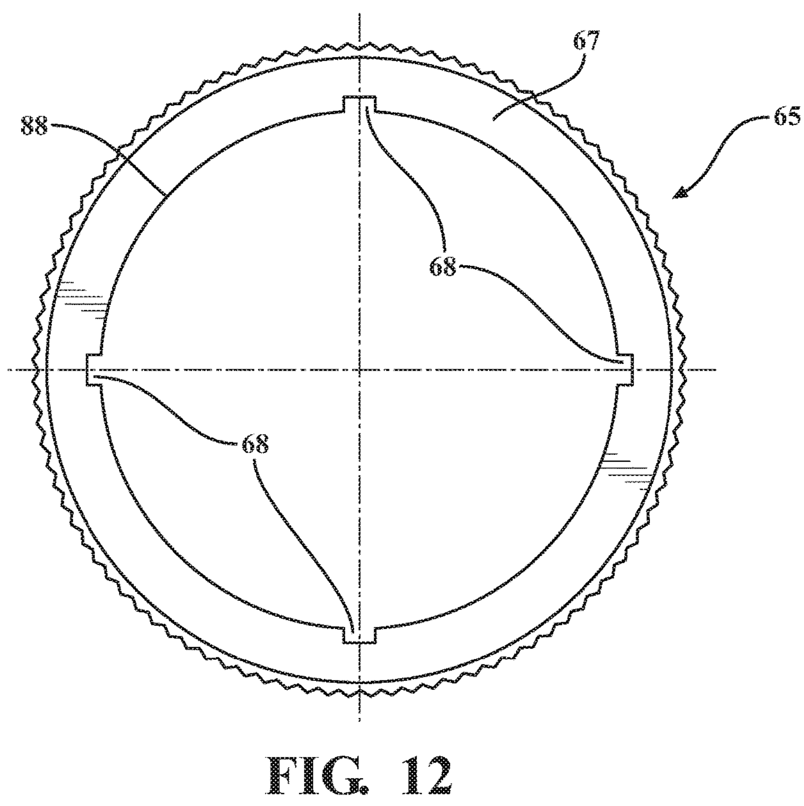
FIG. 12 is a top view of the exit bearing of FIG. 11.

Referring now to FIGS. 3, 4, 11 and 12, the exit bearing 64 has a cylindrically shaped outer surface which has an outer diameter that is larger than the second diameter $D_2$ of the third portion 38 of the inner bore to facilitate an interference fit between the exit bearing 64 and the housing 22. The outer surface is also provided with a plurality of axially extending knurls 85, or ridges, which are spaced circumferentially from one another for restricting rotation of the exit bearing 64 relative to the housing 22. As shown in FIG. 12, an opening 88 at the top of the exit bearing 64 is generally circular for allowing the ball stud 50 to freely pivot relative to the housing 22 and the exit bearing 64 in any direction.

Figure 13:
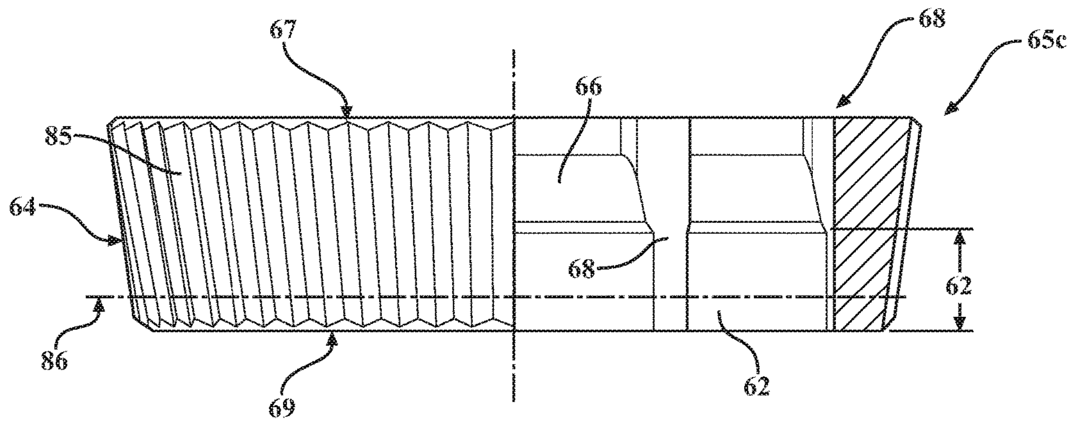
FIG. 13 is a front and partially sectioned view of a second exemplary embodiment of the exit bearing.
Figure 14:
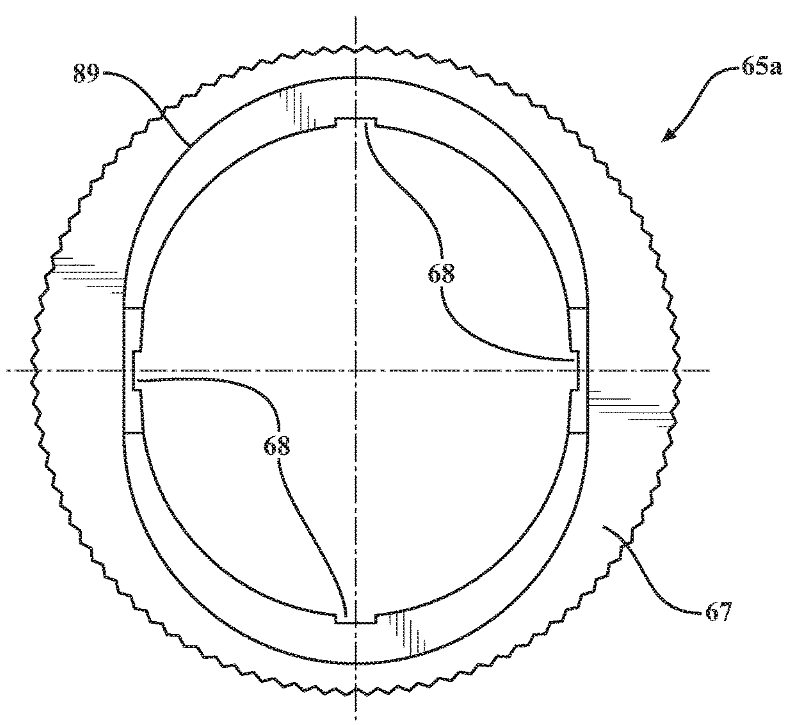
FIG. 14 is a front and partially sectioned view of the second exemplary embodiment of the exit bearing.

Referring now to FIGS. 13 and 14, wherein like numerals, separated by a prefix of "1" indicate corresponding parts with the above-described embodiment, in an alternate embodiment of the exit bearing 164, the outer surface of the exit bearing 164 is tapered. Specifically, the exit bearing 164 has a frusto-conical shape with a small circumference towards the closed first end 24 (shown in FIG. 4) and with a large circumference towards the open first end 26 (also shown in FIG. 4) of the housing 22 (also shown in FIG. 4). In this embodiment, the opening 188 at the top of the exit bearing 164 is generally oval, or elliptical, in shape for restricting the pivotal movement of the ball stud 50 (shown in FIG. 4) relative to the exit bearing 164 and relative to the housing 22 (also shown in FIG. 4) in one direction as compared to another direction.

Figure 8:
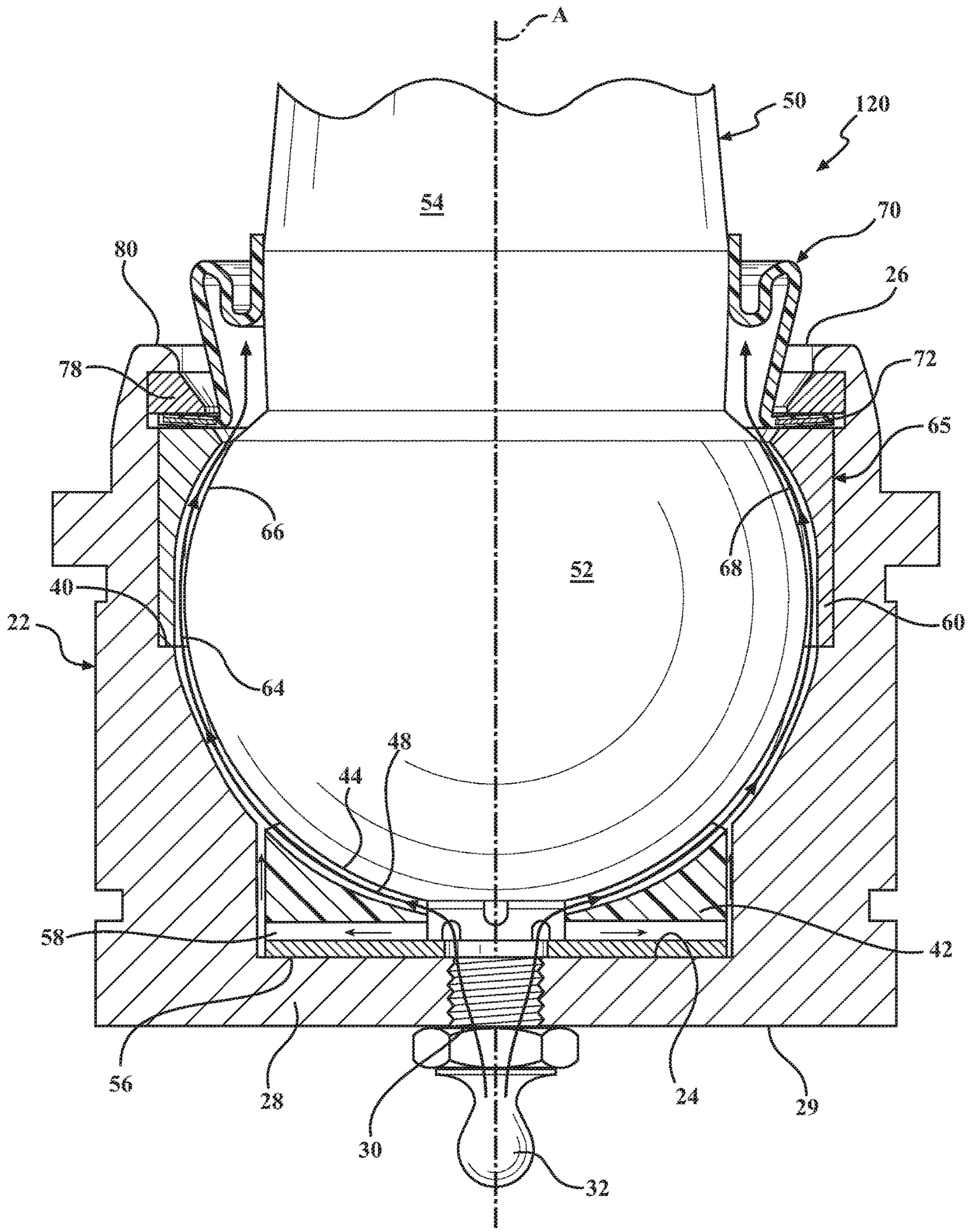
FIG. 8 is a cross-sectional and fragmentary view of a second exemplary embodiment of the socket assembly.
Figure 9:
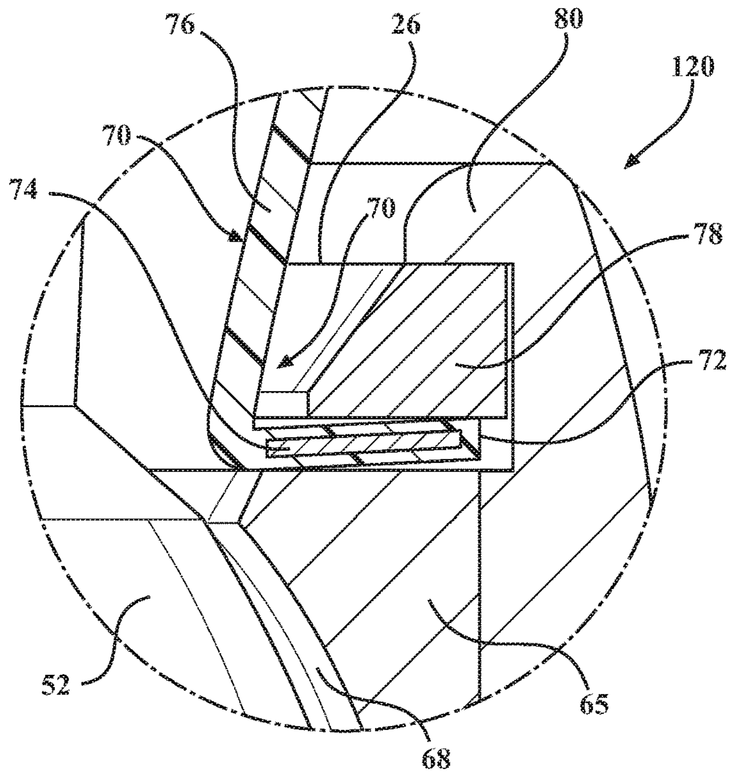
FIG. 9 is an enlarged view of a portion of FIG. 8.

Referring now to FIGS. 8 and 9, another exemplary embodiment of the socket assembly 120 is generally shown. The second exemplary embodiment is distinguished from the first exemplary embodiment by the radially outwardly extending flange 72 on the boot body 76 including a Belleville spring washer 74 embedded therein rather than a rigid and non-flexible insert. The Belleville spring washer 74 applies a biasing force to urge the exit bearing 65 against the ball portion 52 of the ball stud 50. Also provided is a cover plate 78 which is positioned between the radially inwardly extending lip 80 of the housing 22 and the radially outwardly extending flange 72 of the boot body 76.

Figure 10:
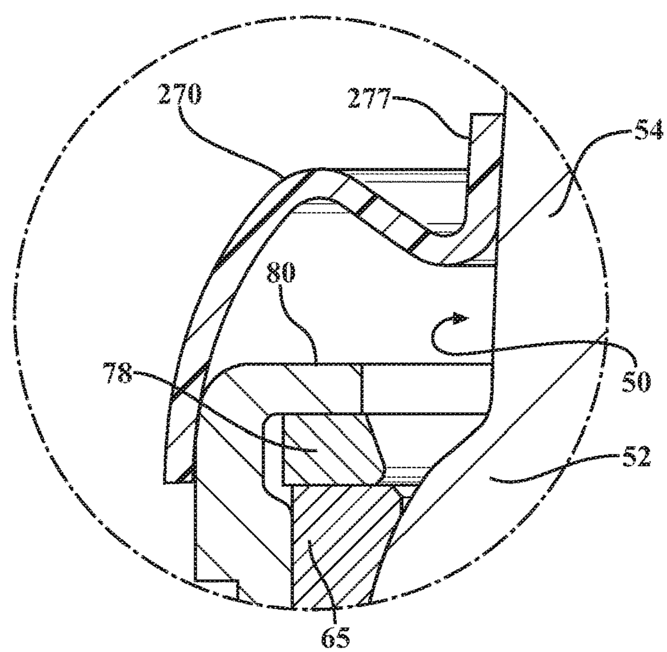
FIG. 10 is a cross-sectional and fragmentary view of a portion of a third exemplary embodiment of the socket assembly.
Figure 11:
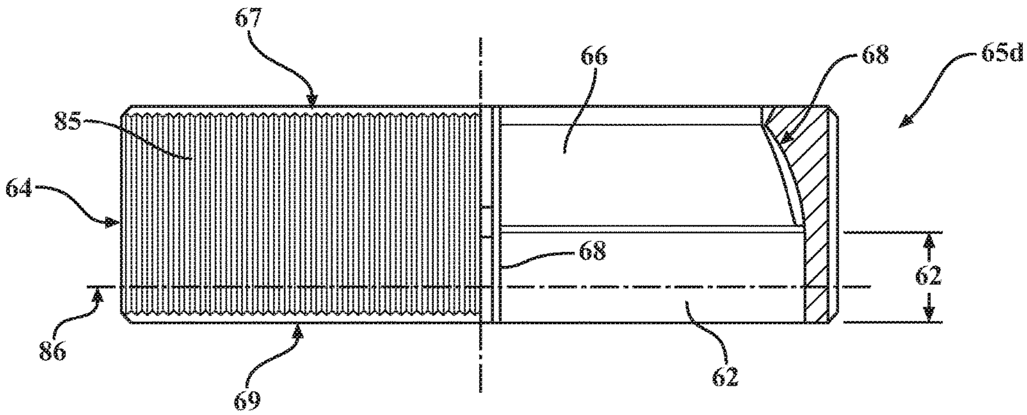
FIG. 11 is a front and partially sectioned view of a first exemplary embodiment of an exit bearing.

Referring now to FIG. 10, yet another exemplary embodiment of the socket assembly 220 is generally shown with like numerals, separated by a prefix of "2" indicating corresponding parts with the above-described embodiments. In this exemplary embodiment, the dust boot 270 is sealed against an outer surface 21 of the housing 22 rather than an inner surface as is the case in the other embodiments.

Another aspect of the present invention is for a method of making a socket assembly 20. The method includes the step of preparing a housing 22 with an inner bore which extends from a lower wall 28 at a generally closed first end 24 to an open second end 26. The lower wall 28 has an exterior surface with a conically shaped projection 90 that projects in an axial direction away from the second open end 26. The method continues with the step of inserting a spring, such as a Belleville spring washer 56, into the inner bore of the housing 22. The method proceeds with the step of inserting a backing bearing 42 with a first bearing surface 44 into the inner bore of the housing 22 such that the backing bearing 42 is movable in a radial direction relative to the housing 22 within the inner bore. The method continues with the step of inserting a ball portion 52 of a ball stud 50 into the inner bore of the housing 22 such that a shank portion 54 of the ball stud 50 extends from the ball portion 52 out of the inner bore through the open second end 26 of the housing 22. The method proceeds with the step of fixing an exit bearing 65 with a second bearing surface 66 into a fixed position within the inner bore of the housing 22. In the exemplary method, the exit bearing 65 is fixed between a shoulder 40 of the housing 22 and a radially extending lip 80 that is formed by swaging the open second end 26 of the housing 22. The method continues with the step of deforming the lower wall 28 at the generally closed first end 24 of the housing 22 to preload the Belleville washer 56 against the backing bearing 42 and urge the first bearing surface 44 of the backing bearing 42 against an outer surface of the ball portion 52 of the ball stud 50. In the exemplary method, the step of deforming is further defined as pressing the projection 90 until the exterior surface of the wall is generally flat. The lower wall 28 could be pressed, for example, with a ram.

It should be appreciated that the use of the orientation defining terms such as "upper" and "lower" herein is in reference to the orientation of the socket assembly 20 in the Figures and is not considered to require a particular orientation or otherwise be limiting.

Obviously, many modifications and variations of the present invention are possible in light of the above teachings and may be practiced otherwise than as specifically described while within the scope of the appended claims.

What is claimed is:

1. A socket assembly, comprising:

a housing with an inner bore that extends along an axis from a wall at a generally closed first end to an open second end;

said housing being made as a monolithic piece of metal;

said wall of said housing presenting a lubricant opening;

a grease fitting received in said lubricant opening of said wall;

a ball stud having a ball portion received in said inner bore of said housing and a shank portion which projects out of said inner bore through said open second end of said housing;

a backing bearing disposed in said inner bore and being movable relative to said housing in both a radial direction and an axial direction and presenting a semi-spherically curved first bearing surface in sliding contact with an outer surface of said ball portion of said ball stud;

an exit bearing locked into a fixed position within said inner bore of said housing and having a second bearing surface in sliding contact with said ball portion of said ball stud;

a spring positioned in said inner bore of said housing between said wall of said housing and said backing bearing and imparting a preload force against said backing bearing; and said wall at said generally closed first end of said housing being deformed to preload said spring against said backing bearing and further bias said backing bearing against said ball portion of said ball stud and to reduce clearances within said socket assembly.

2. The socket assembly as set forth in claim 1 wherein said second bearing surface of said exit bearing includes a semi-spherically curved portion which is in sliding contact with an opposite hemisphere of said ball portion of said ball stud from said backing bearing and a cylindrical portion which extends past and is in sliding contact with an equator of said ball portion of said ball stud.

3. The socket assembly as set forth in claim 1 wherein said inner bore of said housing has a progressively increasing diameter from said generally closed first end to said open second end and presents a shoulder which faces towards said open second end and wherein said exit bearing abuts said shoulder.

4. The socket assembly as set forth in claim 3 wherein said housing includes a radially inwardly extending lip at said open second end and wherein said exit bearing is trapped between said radially inwardly extending lip and said shoulder.

5. The socket assembly as set forth in claim 4 further including a dust boot extending from an end that is trapped between said radially inwardly extending lip and said exit bearing to an end that is sealed against said shank portion of said ball stud.

6. The socket assembly as set forth in claim 1 wherein said spring is a Belleville washer.

7. The socket assembly as set forth in claim 1 wherein said generally closed first end includes a lubricant opening.

8. A method of making a socket assembly, comprising the steps of:

preparing a housing with an inner bore which extends from a wall at a generally closed first end to an open second end and wherein the wall has an exterior surface with a projection that projects in a direction away from the second open end;

inserting a spring into the inner bore of the housing through the second open end;

inserting a backing bearing with a first bearing surface into the inner bore through the second open end of the housing such that the backing bearing is movable relative to the housing in a radial direction within the inner bore;

inserting a ball portion of a ball stud into the inner bore through the second open end of the housing and wherein the ball stud has a shank portion which extends from the ball portion out of the inner bore through the open second end of the housing;

fixing an exit bearing with a second bearing surface into a fixed position within the inner bore of the housing; and deforming the wall at the generally closed first end of the housing to preload the spring against the backing bearing and urge the first bearing surface of the backing bearing against an outer surface of the ball portion of the ball stud and to reduce clearances between components in the inner bore of the housing.

9. The method as set forth in claim 8 wherein the step of deforming the wall is further defined as pressing the projection of the wall.

10. The method as set forth in claim 9 wherein the step of pressing the projection of the wall is further defined as pressing the projection of the wall until the exterior surface of the wall is generally flat.

11. The method as set forth in claim 10 wherein the projection is generally conical in shape.

12. The method as set forth in claim 8 wherein the inner bore of the housing presents a shoulder that faces towards the open second end and wherein the exit bearing abuts the shoulder.

13. The method as set forth in claim 9 further including the step of swaging the open second end of the housing to present a radially inwardly extending lip to trap the exit bearing within the housing between the radially inwardly extending lip and the shoulder.

14. The method as set forth in claim 8 wherein the second bearing surface includes a semi-spherically curved portion and a cylindrical portion.

15. The method as set forth in claim 8 wherein the generally closed first end of the housing includes a lubricant opening.

* * * * *